US 9,129,276 B1

(12) United States Patent
Fasoli et al.

(10) Patent No.: US 9,129,276 B1
(45) Date of Patent: Sep. 8, 2015

(54) INVENTORY MANAGEMENT

(75) Inventors: Jonathan David Fasoli, Aliso Viejo, CA (US); Amy M. Kerman, Mountain View, CA (US); Brandon Gador, Mountain View, CA (US); William Michael Dorsch, De Pere, WI (US)

(73) Assignee: Intuit Inc., Mountain View, CA (US)

( * ) Notice: Subject to any disclaimer, the term of this patent is extended or adjusted under 35 U.S.C. 154(b) by 285 days.

(21) Appl. No.: 13/287,926

(22) Filed: Nov. 2, 2011

(51) Int. Cl.
*G06G 1/14* (2006.01)
*G06Q 20/00* (2012.01)
*G06Q 20/20* (2012.01)

(52) U.S. Cl.
CPC .................................. *G06Q 20/203* (2013.01)

(58) Field of Classification Search
None
See application file for complete search history.

(56) References Cited

U.S. PATENT DOCUMENTS

| 6,363,362 | B1 * | 3/2002 | Burfield et al. ................ 705/40 |
| 2004/0153382 | A1 * | 8/2004 | Boccuzzi et al. ............... 705/34 |
| 2004/0190790 | A1 * | 9/2004 | Zuev et al. .................... 382/291 |
| 2006/0095373 | A1 * | 5/2006 | Venkatasubramanian et al. ............................. 705/40 |
| 2007/0124216 | A1 * | 5/2007 | Lucas ............................ 705/27 |
| 2008/0133388 | A1 * | 6/2008 | Alekseev et al. ............... 705/34 |
| 2008/0208679 | A1 * | 8/2008 | Baumann et al. .............. 705/10 |
| 2009/0271297 | A1 * | 10/2009 | McCracken et al. ........... 705/28 |
| 2011/0208649 | A1 * | 8/2011 | Shader et al. .................. 705/40 |

FOREIGN PATENT DOCUMENTS

WO  WO 2008/058871  *  5/2008  ............... G06K 9/20

* cited by examiner

*Primary Examiner* — Ryan Zeender
*Assistant Examiner* — Christopher Buchanan
(74) *Attorney, Agent, or Firm* — Osha Liang LLP (57) ABSTRACT

A method for inventory management. The method includes: obtaining a first invoice sent from a supplier to a first merchant; capturing, by a computer processor, a first set of inventory data from fields on the first invoice; updating a template for the supplier based on capturing the first set of inventory data, where the template includes locations of the fields on the first invoice; obtaining a second invoice sent from the supplier to a second merchant, where the second invoice includes the fields; and capturing, after updating the template and by the computer processor, a second set of inventory data from the fields on the second invoice using the template, where the second set of inventory data includes a quantity of a product purchased from the supplier, and where an inventory database of the second merchant is updated with the quantity of the product.

41 Claims, 7 Drawing Sheets

Mobile Device 499

Acme Hardware Supply                January 1, 2011
1212 Jefferson St.
Albuquerque, NM 87043
Customer Service: 1-800-555-1154

Bill's Hardware
115 Main St.
Round Rock, TX 78664

INVOICE

| Description | SKU | Quantity | Cost/unit | Item Total |
|---|---|---|---|---|
| (1) Large crescent wrench | 11022 | 50 | $2.50 | $125.00 |
| (1) Screwdriver set | 11033 | 15 | $5.30 | $79.50 |
| (1) Assorted socket wrenches | 11034 | 15 | $5.50 | $82.50 |
| (1) 18 Volt Cordless Drill | 11058 | 5 | $45.75 | $228.75 |
|  |  |  | Total: | $515.75 |

FIG. 4A

Mobile Device 499

Acme Hardware Supply  January 1, 2011
1212 Jefferson St.
Albuquerque, NM 87043
Customer Service: 1-800-555-1154

Popup Dialog 400

Bill's Hardware
115 Main St
Round Rock "(1) Large
crescent wrench"

INVOICE

Edit  Delete

| Description | SKU | Quantity | Cost/unit | Item Total |
|---|---|---|---|---|
| (1) Large crescent wrench | 11022 | 50 | $2.50 | $125.00 |
| (1) Screwdriver set | 11033 | 15 | $5.30 | $79.50 |
| (1) Assorted socket wrenches | 11034 | 15 | $5.50 | $82.50 |
| (1) 18 Volt Cordless Drill | 11058 | 5 | $45.75 | $228.75 |

Total:    $515.75

Please tab through the identified fields in order to view and/or modify mappings. When you are satisfied with the mappings, select the Submit button.

Submit

INVENTORY MANAGEMENT

BACKGROUND

Product purchasing is an important aspect of running a successful business operation. Many business owners dedicate significant resources to cultivating and maintaining supplier relationships. Unfortunately, when purchasing significant numbers of products from more than one supplier, it can be difficult to select an appropriate supplier for each product, decide when to buy the product, determine the correct quantity to order, and to continuously monitor dynamically changing prices, promotions, and product offerings.

Another inefficiency involved in product purchasing is the substantial overhead of entering data into a business inventory system. When dealing with multiple suppliers using differing and sometimes incompatible software, businesses are sometimes required to perform manual data entry and to manually re-order new products when quantities are low. In order to minimize this inefficiency, some businesses utilize only a small number of suppliers, and will elect to forego purchasing at a discount from a different supplier just to avoid the potential overhead costs.

Each supplier may provide a paper or electronic invoice to the business along with each order. As invoices arrive, the business must continuously update its inventory management system and must continuously monitor supplier and inventory data in order to make prudent financial decisions. As point-of-sale (POS), inventory, and financial management systems have become ubiquitous in the retail environment, the sales, inventory, and financial management of business operation has grown increasingly disconnected from product purchasing and supplier relationship management.

SUMMARY

In general, in one aspect, the invention relates to a method for inventory management. The method includes: obtaining a first invoice sent from a supplier to a first merchant; capturing, by a computer processor, a first set of inventory data from fields on the first invoice; updating a template for the supplier based on capturing the first set of inventory data, where the template includes locations of the fields on the first invoice; obtaining a second invoice sent from the supplier to a second merchant, where the second invoice includes the fields; and capturing, after updating the template and by the computer processor, a second set of inventory data from the fields on the second invoice using the template, where the second set of inventory data includes a quantity of a product purchased from the supplier, and where an inventory database of the second merchant is updated with the quantity of the product.

In general, in one aspect, the invention relates to a system for inventory management. The system includes: a processor; an inventory management database including a template for a supplier; and an inventory management server executing on the processor and configured to: obtain a first invoice sent from a supplier to a first merchant, capture a first set of inventory data from fields on the first invoice, update the template for the supplier based on capturing the first set of inventory data, where the template includes locations of the fields on the first invoice, obtain a second invoice sent from the supplier to a second merchant, where the second invoice includes the fields, capture, after updating the template, a second set of inventory data from the fields on the second invoice using the template, where the second set of inventory data includes a quantity of a product purchased from the supplier, and where an inventory database of the second merchant is updated with the quantity of the product.

In general, in one aspect, the invention relates to a non-transitory computer-readable storage medium storing instructions for inventory management. The instructions include functionality to: obtain a first invoice sent from a supplier to a first merchant; capture, by a computer processor, a first set of inventory data from fields on the first invoice; update a template for the supplier based on capturing the first set of inventory data, where the template includes locations of the fields on the first invoice; obtain a second invoice sent from the supplier to a second merchant, where the second invoice includes the fields; and capture, after updating the template and by the computer processor, a second set of inventory data from the fields on the second invoice using the template, where the second set of inventory data includes a quantity of a product purchased from the supplier, and where an inventory database of the second merchant is updated with the quantity of the product.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for inventory management. In general, embodiments of the invention obtain an invoice sent from a supplier to a merchant. The invoice is then analyzed and a set of inventory data is captured from fields on the invoice. A template for the supplier is updated based on capturing the set of inventory data. The template is then utilized to capture the inventory data from one or more other invoices sent from the supplier to one or more other merchants.

Figure 1A:
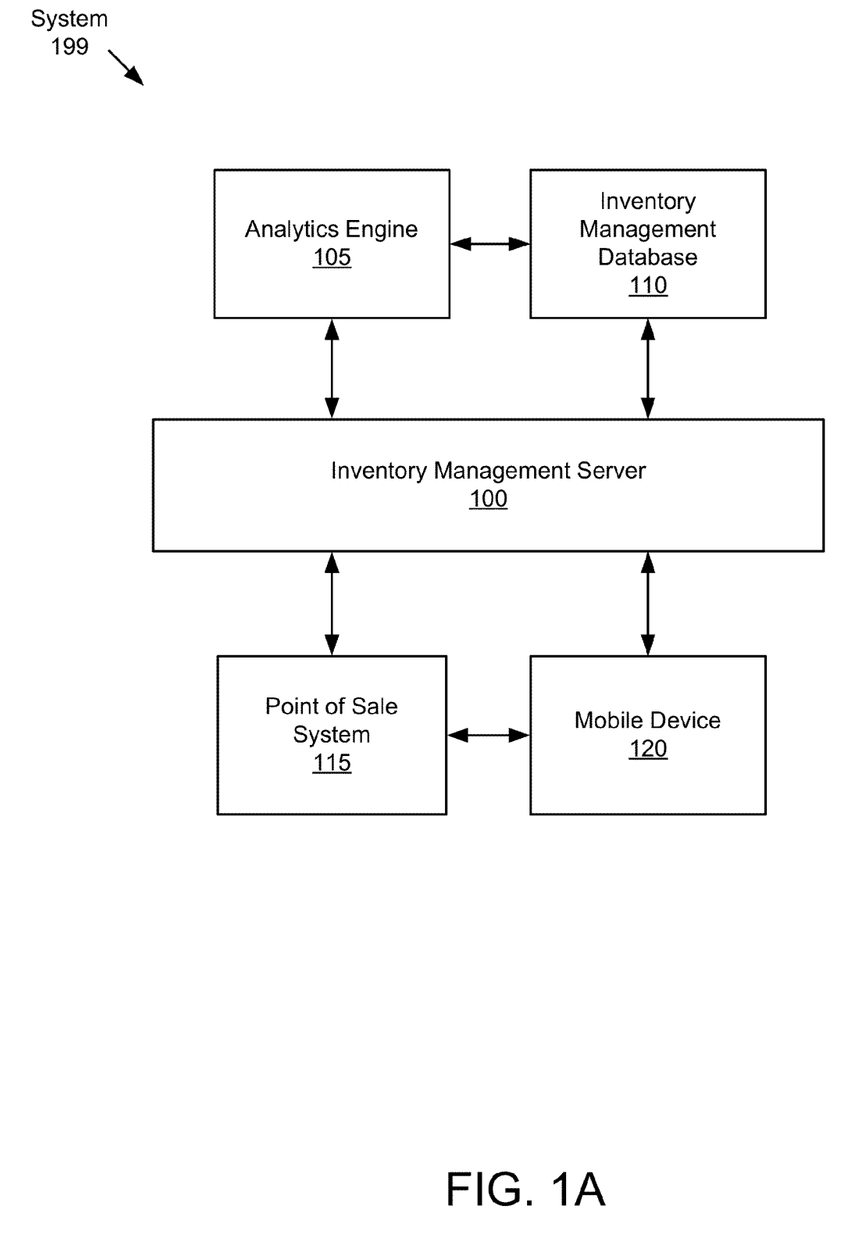
FIG. 1A shows a schematic diagram in accordance with one or more embodiments of the invention.

FIG. 1A shows a system (199) in accordance with one embodiment of the invention. As shown in FIG. 1A, the system has multiple components including an inventory management server (100), an analytics engine (105), an inventory management database (110), a point-of-sale (POS) system (115), and a mobile device (120). The components of the system may be located on the same device (e.g., a server, mainframe, desktop Personal Computer (PC), laptop, Personal Digital Assistant (PDA), telephone, mobile phone, kiosk, cable box, and any other device) or may be located on separate devices connected by a network (e.g. the Internet), with wired and/or wireless segments. Those skilled in the art will appreciate that there may be more than one of each separate component running on a device, as well as any combination of these components within a given embodiment of the invention.

In one or more embodiments of the invention, the inventory management server (100) is a software application or a set of software applications executing on one or more hardware processors. The software application may be a web application in a server of a data center, a client application executing on a computing device, and/or a cloud computing application in a network distributed system.

In one or more embodiments of the invention, the inventory management server (100) includes functionality to receive one or more invoices sent from a supplier to a merchant. The inventory management server (100) may be configured to receive the invoice from the mobile device (120). In one or more embodiments of the invention, the inventory management server (100) includes a web interface configured to receive one or more invoices.

In one or more embodiments of the invention, the inventory management server (100) is configured to receive one or more emails including the invoice from a representative, owner, and/or employee of the business. The inventory management server (100) may assign a unique email address to each merchant and may be configured to receive emails sent by the merchant or a third party entity to the unique email address. Each email may include one or more embedded or attached invoices and may be sent by the mobile device (120) and/or any other personal computing device to the designated unique email address assigned to the merchant.

An invoice is any bill for goods and/or services sold by a supplier to a merchant. The invoice may be provided to the merchant in paper or electronic form. The invoice may include a set of fields containing inventory data (such as, but not limited to, quantity, price, description, tax rate, etc.) and may be sent by the supplier to the merchant and/or sent directly to the inventory management server (100). The inventory management server (100) may be configured to request and/or receive invoices from the supplier on behalf of the merchant. The invoice may also be a return invoice or may include one or more return items. In the case of defective and/or return items, the invoice may include one or more credit amounts (i.e., negative amounts) paid or payable from the supplier to the merchant for returned or defective items.

In one or more embodiments of the invention, the inventory management server (100) includes a user interface. The user interface may be accessible by merchants, suppliers, and/or third party entities in accordance with various embodiments of the invention. Thus, the user interface may also be configured to receive and process invoices directly from the supplier.

In one or more embodiments of the invention, the inventory management server (100) includes functionality to identify one or more fields on the invoice. The inventory management server (100) may perform optical character recognition (OCR) on an electronic invoice (e.g., an image of a paper invoice). Any other method of identifying fields on the invoice may be used. The inventory management server (100) may identify one or more regions of the invoice corresponding to one or more fields. The region identifications may be stored as location coordinates defining one or more edges of the region. Each coordinate may be defined relative to another coordinate, object, shape, or attribute of the invoice (e.g., an edge of the invoice, a divider, a text block, an image, etc.). In one example, a location coordinate defines a text block as follows: 10 pct, 20 px, 10 pct, 80 px. In this example, the first two coordinates define horizontal edges and the last two coordinates define vertical edges. The first edge is located at 10 percent of the page height beginning at the top of the page and the second coordinate is located at 20 pixels below the first edge. The third edge is located at 10 percent of the page width beginning at the left edge and the fourth coordinate is located at 80 pixels to the right of the third edge. Any other method of defining regions may be used, in accordance with various embodiments of the invention.

In one or more embodiments of the invention, the inventory management server (100) includes functionality to receive a confirmation and/or modification of the identified fields. The inventory management server (100) may send the identified fields to the mobile device (120), the point of sale system (115), or a computing device of the merchant for confirmation/modification. Thus, in one or more embodiments of the invention, the mobile device (120) and/or computing device includes a user interface configured to display the identified fields to the user. The user interface may allow the user to create or modify template data and/or inventory data identified by the inventory management system (100). For example, the user interface may display the invoice with a set of indications overlaying the invoice. In this example, the user may select an indication in order to modify and/or create template/ inventory data associated with the corresponding field or region of the invoice. The user may also remove one or more indications and/or associate an indication with a different field or location of the invoice if necessary. Additionally, for first time invoices, the user can specify the location of an invoice characteristic via "tagging" the location to an associated metric.

In one or more embodiments of the invention, the inventory management server (100) includes functionality to capture (e.g., scrape) inventory data from one or more fields on the invoice. Examples of inventory data may include, but are not limited to, product description, product quantity, unit price, line item price, total price, invoice date, purchase order number, shipping date, payment type, payment terms, billing information, product identifier, invoice number, shipping cost, tax amount, tax rate, and sales representative.

In one or more embodiments of the invention, the inventory management server (100) includes functionality to create a template for the supplier. A template is a collection of information (i.e., template data) which may be utilized to capture inventory data from the invoice. Template data may include locations of one or more fields on the invoice, default values of the one or more fields, field names, a layout of the invoice, one or more mappings between related or identical fields on the invoice, and/or supplier information (e.g., name, address, payment information, etc.). Locations of one or more fields on the invoice may be stored in the inventory management server (100) may be configured to create the template based on capturing inventory data from an invoice of the supplier.

The inventory management database (110) may be a relational database, a cloud database, an embedded database, a networked database, a distributed database, a clustered database, a flat file, a database management system (DBMS), and/or any other repository of data accessible by the inventory management server (100). The inventory management database (110) may reside on a single computing device or any number of computing devices operatively connected by a computer network.

In one or more embodiments of the invention, the inventory management database (110) includes functionality to store template data and/or inventory data of one or more suppliers.

The inventory management database (110) may also store analytics data and/or aggregated data, in accordance with various embodiments of the invention.

In one or more embodiments of the invention, the inventory management server (100) includes functionality to capture inventory data from an invoice of the supplier using the template. The inventory management server (100) may identify regions of the invoice and may label the identified regions with one or more labels. This may be performed using optical character recognition (OCR) to identify labels and fields on the invoice. The initial identification and labeling of the regions may include one or more blank labels and/or default labels. The inventory management server (100) may then analyze the identified region(s) and/or label(s) using one or more secondary analysis methods (which may include a second OCR analysis based on user input, confirmation, and/or modification of the label(s)/value(s)). In one or more embodiments of the invention, the inventory management server (100) includes functionality to present the identified regions and/or labels to the user for confirmation. The inventory management server (100) may display an image of the invoice with the identified regions and/or labels overlaid onto the image. The inventory management server (100) may receive a modification of one or more selected regions from the user by allowing the user to drag one or more edges of a box or other geometric shape identifying the region (i.e., in order to expand/contract the region).

In one or more embodiments of the invention, the inventory management server (100) includes functionality to update the template based on capturing inventory data from an invoice of the supplier. The inventory management server (100) may modify, add, and/or remove one or more labels and/or regions of the template based on regions/labels identified in a new invoice. Thus, if the merchant modifies the invoice, the inventory management server (100) may modify the corresponding template to reflect the new invoice. Furthermore, the matching and/or extraction of data from invoices may be improved gradually as the number of analyzed invoices increases.

In one or more embodiments of the invention, the inventory management server (100) includes functionality to receive an image of a barcode corresponding to the product from the mobile device (120). Alternatively, the inventory management server (100) may receive the barcode from any computing device utilized by the merchant or a representative of the merchant. The merchant or representative may scan the barcode with a handheld scanning device or may photograph the barcode with a camera embedded within or operatively connected to the mobile device (120), in accordance with various embodiments of the invention. The barcode may uniquely identify the product within an inventory management system of the merchant and/or supplier. In one or more embodiments of the invention, in place of the barcode, any other image encoding a unique product idenfier (e.g., an integer identifier) may be used by the inventory management server (100). For example, the inventory management server (100) may utilize a Quick Response (QR) code to identify one or more products identified on an invoice.

In one or more embodiments of the invention, the inventory management server (100) includes functionality to extract a product identifier of the product from the barcode. The product identifier may be any unique identifier of one or more products identified by an invoice of a supplier. Examples of a product identifier may include, but are not limited to, an alphanumeric string, a numeric string, an alphabetic string, an integer string, and/or any textual string in accordance with various embodiments of the invention.

In one or more embodiments of the invention, the inventory management server (100) includes functionality to map the product identifier to the product. Mapping the product identifier to the product may involve creating a record in the inventory management database (110) in order to link the unique product identifier with the product. Furthermore, one or more existing records in the inventory management database (110) may also be modified to reflect the link. For example, the inventory management server (100) may modify an existing mapping between the product and a previous product identifier in the inventory management database (110). In this example, the existing mapping is identified based on a label or description of the product identified on a supplier's invoice. Continuing the example, the inventory management server (100) also identifies unmapped records in the inventory management database (110) which match the label or description and populates those records with the product identifier.

In one or more embodiments of the invention, the inventory management server (100) includes functionality to identify, in an inventory database, a current inventory of the product using the product identifier. The inventory database may reside within or be operatively connected to the point of sale system (115), in accordance with various embodiments of the invention. The inventory management server (100) may add the quantity of the product to the current inventory in order to reflect receipt of a new shipment of the product as indicated on the invoice.

In one or more embodiments of the invention, the inventory management server (100) includes functionality to calculate an average time period between periodic orders from one or more suppliers. The average time period may be an average number of days between past orders from the supplier, or a variation thereof. The inventory management server (100) may detect that the average time period is elapsed since the last order from the supplier. As a result, the inventory management server (100) may send a notification to one or more users, representatives, owners, and/or employees of the business. The notification may include a warning of low inventory, an option (i.e., a link, button, or other user interface element) to submit a new order to the supplier, and/or a date of the last order placed, in accordance with various embodiments of the invention.

In one or more embodiments of the invention, the inventory management server (100) includes functionality to identify a predefined on-hand or in channel inventory threshold for a product. The inventory threshold is a quantity of the product which determines when a re-order or notification requesting re-order is generated by the inventory management server (100). Thus, the inventory management server (100) may automatically re-order a predefined quantity of the product when the current quantity of the product falls below the inventory threshold. Alternatively, the inventory management server (100) may send a notification to the user containing an option to re-order. The inventory management server (100) may be communicatively connected to an inventory database or application and may obtain inventory amounts from the inventory database/application accordingly. The inventory threshold may be obtained from a user or entity (e.g., a software application) or given an initial default value by the inventory management server (100). The inventory management server (100) may also modify the inventory threshold in response to instructions from a user or entity.

In one or more embodiments of the invention, the analytics engine (105) includes functionality to aggregate a set of invoices from any number of suppliers into the inventory management database (110). The analytics engine (105) may also store metadata, analytics data, inventory data, and/or template data in the inventory management database (110).

In one or more embodiments of the invention, the inventory management server (100) includes functionality to identify one or more competing suppliers offering a product identified on an invoice of a supplier. The inventory management server (100) may identify the competing suppliers based on invoices of one or more other merchants and may send a message or report to an owner, representative, or employee of a merchant including the competing suppliers. For example, the inventory management server (100) may receive an invoice including 500 units of Acme brand shoes from a merchant. In this example, the inventory management server (100) searches the inventory management database (110) for Acme brand shoes and identifies five other suppliers who have sold the shoes to other merchants within the last year. The inventory management server (100) then sends an email message to the merchant identifying the five competing suppliers. The message may be an email message, a short message service (SMS) message, a text message, and/or any other form of physical or electronic notification generated by the inventory management server (100), in accordance with various embodiments of the invention.

In one or more embodiments of the invention, the inventory management server (100) includes functionality to establish a merchant agreement with a merchant. The merchant agreement may be a contract signed (electronically or otherwise) by the merchant and including terms of financial compensation in exchange for one or more services. The services may include any function of the inventory management server (100) and may be priced per usage, per time period, and/or in accordance with any other criteria, in accordance with various embodiments of the invention. Thus, the inventory management server (100) may be configured to establish the agreement with the merchant and to receive periodic financial compensation from the merchant in accordance with the agreement.

In one or more embodiments of the invention, the analytics engine (105) includes functionality to perform analytics on data stored in the inventory management database (110). The analytics engine (105) may identify a purchased product in any number of invoices sold from any number of suppliers. The analytics engine (105) may then calculate an average price paid for the product, an average shipping price of the product, and average quantity of the product, and/or any number of statistical calculations (e.g., mean, median, mode, etc.) in response to a request. In one or more embodiments of the invention, the inventory management server (100) is configured to receive product and/or supplier ratings from one or more users, representatives, and/or business owners. The analytics engine (105) may then analyze the ratings using statistical analysis techniques to generate aggregated analytics data.

In one or more embodiments of the invention, the inventory management server (100) is configured to generate one or more reports containing analytics data. The reports may include information about product pricing, product/supplier reviews (e.g., mean, median, mode ratings, etc.), total product quantity sold by a supplier in a time period, quantity sold of a specified product, and/or any other analytics information generated by the analytics engine (105).

In one or more embodiments of the invention, the mobile device (120) includes functionality to obtain an electronic invoice. The mobile device (120) may obtain and/or produce an image of a paper invoice by an integrated or attached camera or may receive the image from an external computing device by a wired or wireless transmission (e.g., Bluetooth®, Ethernet, universal serial bus (USB), etc.). Bluetooth is a registered trademark of Bluetooth SIG, Inc. The mobile device (120) may be configured to forward the invoice to the inventory management server (100) after obtaining the invoice.

In one or more embodiments of the invention, the mobile device (120) executes one or more mobile applications configured to obtain the invoice, inventory data, template data, and/or analytics data. The mobile device (120) may obtain data from a user or from an external computing device through a wireless network connection.

In one or more embodiments of the invention, the mobile device (120) includes functionality to obtain an image of one or more barcodes corresponding to the product. The barcode may be affixed to the product, a package, and/or the invoice and the mobile device may include a camera capable of photographing the barcode. In one or more embodiments of the invention, the mobile device (120) instructs a user to photograph one or more barcodes after the invoice is obtained. In response to the instruction, the user may position the barcode in range of the camera in order to take the photograph. The mobile device (120) may then send the one or more barcode images to the inventory management server (100).

In one or more embodiments of the invention, the inventory management server (100) includes functionality to extract a product identifier from the barcode. The inventory management server (100) may then map the product identifier to the product in the inventory management database (110) and/or an inventory database (e.g., an inventory management system) of the merchant. If the product identifier is identified within the inventory database, the inventory management server (100) may add a purchased quantity captured from the invoice to a current quantity of the product in the inventory database, or the inventory management server (100) may prompt the user to manually enter the quantity.

In one or more embodiments of the invention, one or more functions of the inventory management server (100) may be performed by the mobile device (120). For example, the mobile device (120) may be configured to capture inventory data from the invoice by performing OCR. In one or more embodiments of the invention, the point of sale system (115) or a component of the point of sale system (115) (e.g., a mobile application) may partially or entirely reside within the mobile device (120), or be accessed from the mobile device (120). In one or more embodiments of the invention, any of the functionality of the analytics engine (105), the mobile device (120), the inventory management database (110), the point of sale (POS) system (115), and/or the inventory management server (100) may reside within any of the components within the aforementioned system (199) or within a separate component operatively connected to or within the system (199).

In one or more embodiments of the invention, the point of sale system (115) is a software application or a set of software applications executing on one or more hardware processors. The software application may be a web application in a server of a data center and/or a cloud computing application in a network distributed system. The point of sale system (115) may be a software application residing in a single computing device (e.g., laptop computer, desktop computer, etc.) residing in a retail location of a merchant. Alternatively, the point of sale system (115) may include one or more server components external to the retail location as well as one or more client components residing within the retail location. In one or more embodiments of the invention, the point of sale system (115) is integrated within or operatively connected to an inventory application, a financial management application (FMA), a personal information manager, and/or any other type of application. The point of sale system (115) may also include a hardware component such as a sales register and/or product scanner.

In one or more embodiments of the invention, the point of sale system (115) includes an inventory database storing inventory quantities of products sold by the merchant. The inventory database may be accessible to the inventory management server (100) in order to allow modification of one or more quantities of a product identified by the inventory management server (100). In one or more embodiments of the invention, the point of sale system (115) is configured to receive one or more security credentials from the inventory management server (100) in order to authenticate access to the inventory database.

In one or more embodiments of the invention, the point of sale system (115) or a component of the point of sale system (115) may reside within the mobile device (120) (i.e., as a native mobile application) or other computing device of the merchant. The point of sale system (115) may also reside within a third party server and may be a web application holding accounts corresponding to any number of merchants, in accordance with various embodiments of the invention.

Figure 1B:
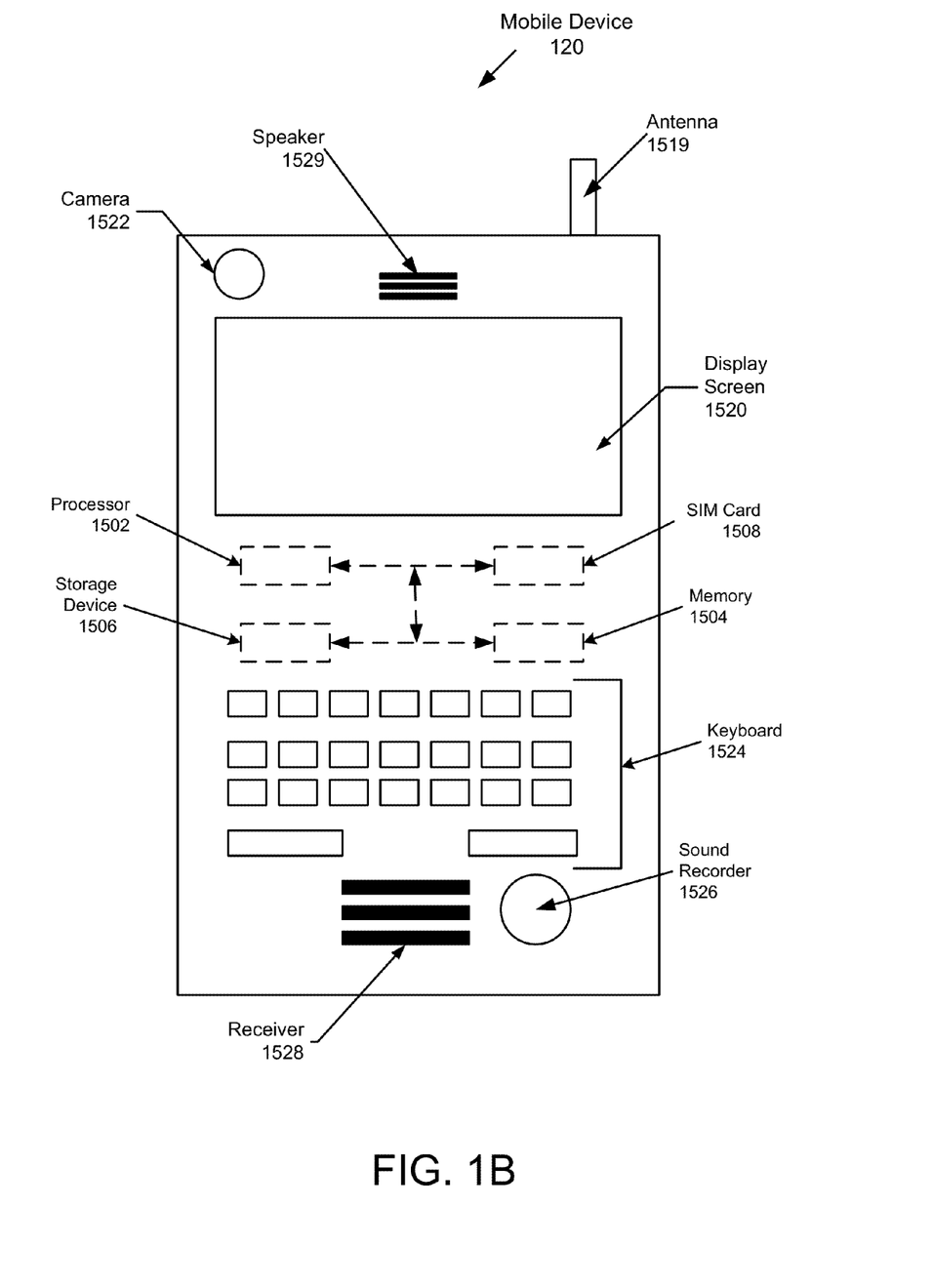
FIG. 1B shows a mobile device in accordance with one or more embodiments of the invention.

Embodiments of the invention may be implemented on virtually any type of mobile device regardless of the platform being used. In one or more embodiments of the invention, the mobile device (120) includes any portable device that provides a user interface. Examples of mobile devices may include, but are not limited to, cellular phones, personal digital assistants, personal communicators, pagers, smart phones, or any other computing device. For example, as shown in FIG. 1B, a mobile device (120) includes a processor (1502), memory (1504), a storage device (1506), a subscriber identification module (SIM) card (1508), a speaker (1529), a receiver (1528), a keyboard (1524), a sound recorder (1526), a display device (1520), a camera (1522), and an antenna (1519).

The mobile device (500) includes one or more processor(s) (1502), associated memory (1504) (e.g., RAM, cache memory, flash memory, etc.), a storage device (1506) (e.g., a hard disk, an optical drive such as a compact disk drive or digital video disk (DVD) drive, a flash memory stick, etc.), a SIM card (1508), and numerous other elements and functionalities typical of today's mobile devices (not shown). The mobile device (120) may include input means and output means, such as the keyboard (1524), the receiver (1528), and/or the display device (e.g., a liquid crystal display screen) (1520), which permits a user to enter and/or display keystrokes including numeric, alphabetic, and other characters, images, or other media types. Other input devices may include a camera (1522), a sound recorder (1526), and/or other data recording mechanism. Those skilled in the art will appreciate that these input and output means may take other forms now known or later developed. Using embodiments of the present invention, a consumer may initiate an electronic funds transfer using the mobile device (120).

The mobile device (120) may be connected to a network (e.g., a local area network (LAN), a wide area network (WAN) such as the Internet, or any other similar type of network) via the antenna (1519) or other network interface connection(s) (not shown). In one or more embodiments of the invention, the network connection may be facilitated by a wireless infrastructure (not shown), including one or more transceivers cooperating to facilitate wireless communications to wireless devices. The wireless infrastructure may include one or more routers, switches, microwave links, base stations, optical fibers, or other similar networking hardware or software components. For example, the wireless infrastructure may be a paging network, a cellular network, etc. In one or more embodiments of the invention, the wireless infrastructure may associate any message received from a mobile device (120) with a mobile device identifier of the mobile device (120).

In one or more embodiments of the invention, the network connection may be facilitated by a hardwired or other similar connection. For example, the network connection may involve a hardwire connection or short-range wireless connectivity technology with a second mobile device, a printing mechanism, a scanner, or a recording system.

Figure 2:
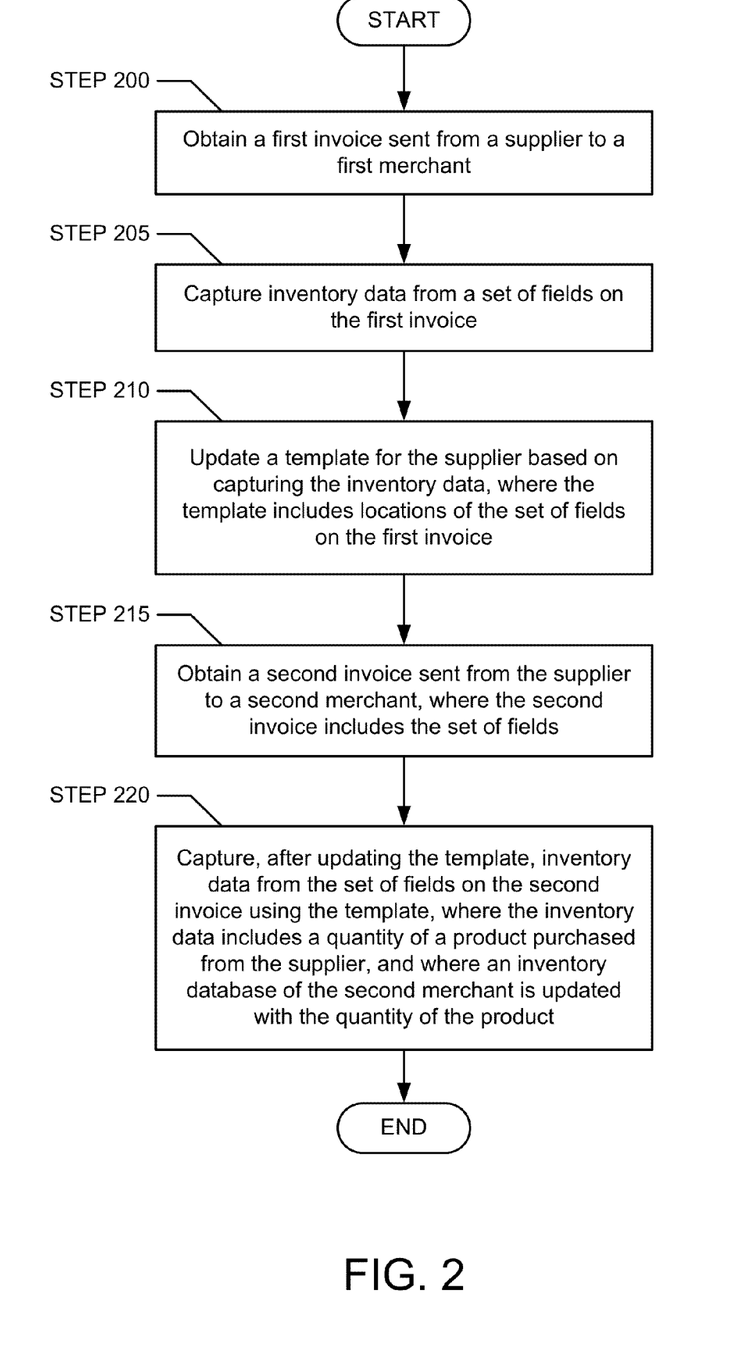
FIGS. 2 and 3 show flowcharts in accordance with one or more embodiments of the invention.

FIG. 2 shows a flowchart of a method for inventory management. While the various steps in this flowchart are presented and described sequentially, one of ordinary skill will appreciate that some or all of the steps may be executed in different orders and some or all of the steps may be executed in parallel. Further, in one or more embodiments of the invention, one or more of the steps described below may be omitted, repeated, and/or performed in different order. Accordingly, the specific arrangement of steps shown in FIG. 2 should not be construed as limiting the scope of the invention.

In STEP 200, in one or more embodiments of the invention, a first invoice sent from a supplier to a first merchant is obtained. The first invoice may be an electronic image of a paper invoice and may be obtained from any computing device used by the merchant or a representative of the merchant. The first invoice may be obtained by an inventory management server (e.g., inventory management server (100) of FIG. 1A, discussed above) residing on a remote server device or a local device of the merchant, in accordance with various embodiments of the invention.

In STEP 205, in one or more embodiments of the invention, inventory data is captured from a set of fields on the first invoice. The inventory data may be captured by identifying regions, labels, and/or text on the invoice. The regions, labels, and/or text on the invoice may be identified using OCR or may be, partially or in whole, received from the supplier or a software application of the supplier, in accordance with various embodiments of the invention. In fact, in one or more embodiments of the invention, the pre-existing template is received directly from the web application of the supplier. The supplier or a software application of the supplier may provide a list of labels, fields, descriptions, and/or related data to be used in analyzing the invoice. For example, the supplier may provide a product list which is then used to identify products on the invoice.

In STEP 210, in one or more embodiments of the invention, a template for the supplier is updated based on capturing the inventory data. The template may include locations of the set of fields on the first invoice and may also be updated based on feedback and/or confirmation of identified fields/labels received from the user. In one or more embodiments of the invention, if an existing template for the supplier is not identified, a new template is created based on capturing the inventory data.

In STEP 215, in one or more embodiments of the invention, a second invoice sent from the supplier to a second merchant is obtained, where the second invoice includes the set of fields. If the first invoice and the second invoice are electronic invoices, they may be based on similar or identical physical invoices.

In STEP 220, in one or more embodiments of the invention, after updating the template, inventory data is captured from the set of fields on the second invoice using the template. The inventory data includes a quantity of a product purchased from the supplier and an inventory database of the second merchant is updated with the quantity of the product. In one or more embodiments of the invention, the process of STEPS 200-210 may be performed for any number of invoices. Thus, the template may be modified any number of times based on any number of invoice analyses.

Figure 3:
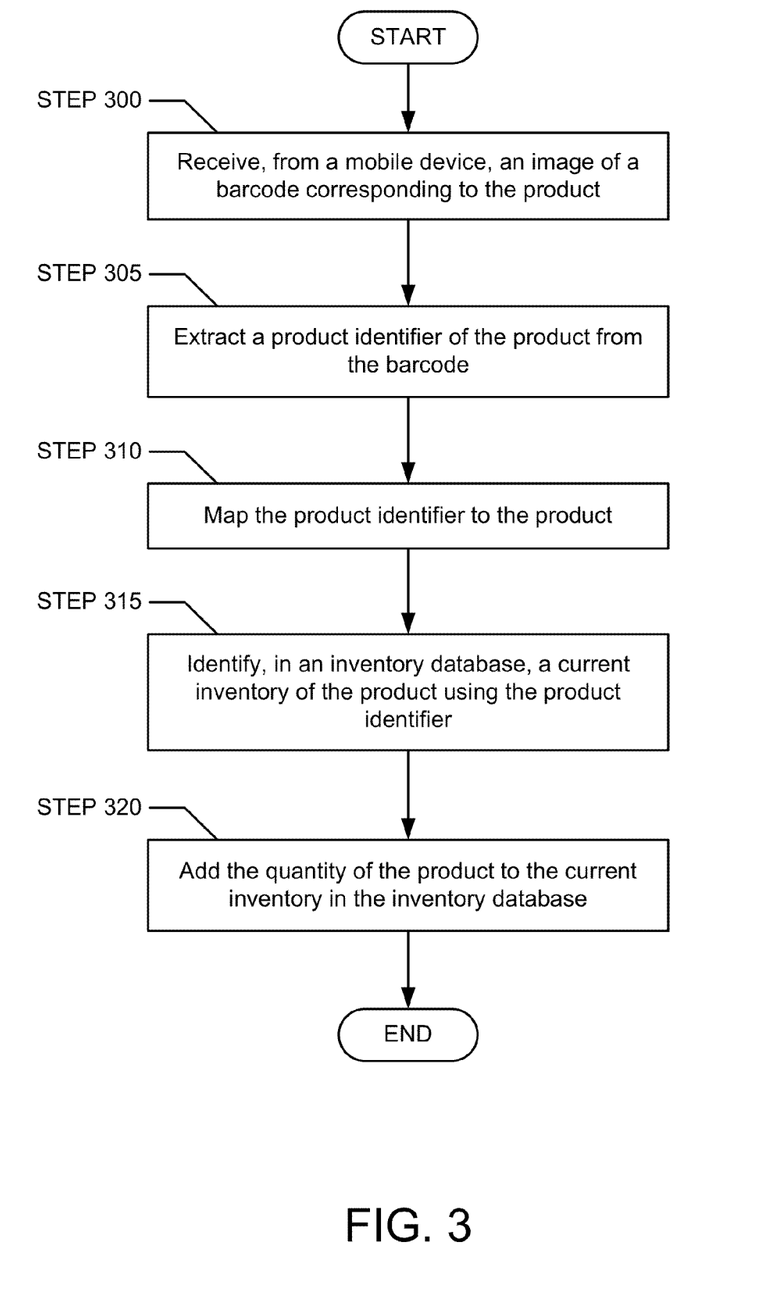

FIG. 3 shows a flowchart of a method for inventory management. While the various steps in this flowchart are presented and described sequentially, one of ordinary skill will appreciate that some or all of the steps may be executed in different orders and some or all of the steps may be executed in parallel. Further, in one or more embodiments of the invention, one or more of the steps described below may be omitted, repeated, and/or performed in different order. Accordingly, the specific arrangement of steps shown in FIG. 3 should not be construed as limiting the scope of the invention.

In STEP 300, in one or more embodiments of the invention, an image of a barcode corresponding to the product is received from a mobile device. Alternatively, any image depicting or encoding a product identifier may be used. The image may be scanned by a representative of the merchant using a mobile device or a scanning device connected to a point of sale (POS) system, in accordance with various embodiments of the invention.

In STEP 305, in one or more embodiments of the invention, a product identifier of the product is extracted from the barcode. The product identifier may be obtained by decoding or decrypting the image according to one or more predefined rules. Obtaining the product identifier may involve performing OCR on the image and utilizing an output of the OCR analysis. The output of the OCR analysis may include the product identifier or a text string used in decoding the product identifier.

In STEP 310, in one or more embodiments of the invention, the product identifier is mapped to the product. The product identifier may be mapped to the product based on a description of the product or a selection of the corresponding product by a user (e.g., the user who scanned the barcode image). Selection of the corresponding product may be performed using a user interface of a web application or a mobile application executing on a mobile device of the user (e.g., mobile device (120)).

In STEP 315, in one or more embodiments of the invention, a current inventory of the product is identified in an inventory database using the product identifier. In one or more embodiments of the invention, the inventory database is modified by obtaining credentials of the merchant for an inventory management application (or a point of sale system, financial management application, or other application storing inventory amounts). The credentials may be obtained by an inventory management server (e.g., inventory management server (100) of FIG. 1A, discussed above). The credentials may then be used to access the inventory management application and to modify application data including one or more inventory amounts. In STEP 320, in one or more embodiments of the invention, the quantity of the product is added to the current inventory in the inventory database.

The following section describes various examples of the invention. The examples are included to aid in the understanding of the invention but are not intended to limit the scope of the invention.

Figure 4A:
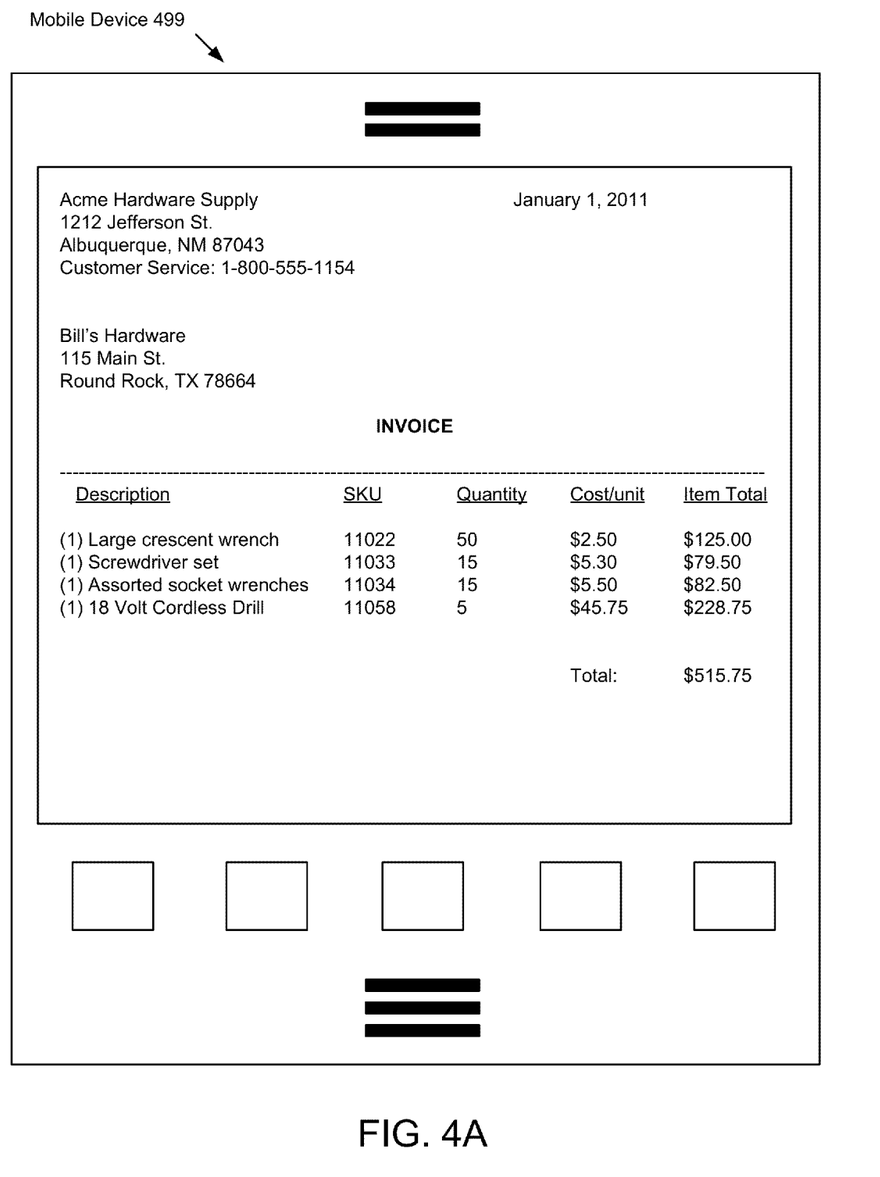
FIGS. 4A and 4B show screenshots of a mobile device in accordance with one or more embodiments of the invention.

FIG. 4A depicts a mobile device (499) in accordance with one or more embodiments of the invention. In this example, an owner of a hardware store (Bill's Hardware) receives a physical invoice from Acme Hardware Supply. The owner uses the mobile device (499) to take an electronic image of the physical invoice. The invoice (i.e., the electronic invoice) is depicted by the screenshot of the mobile device shown in FIG. 4A.

Figure 4B:
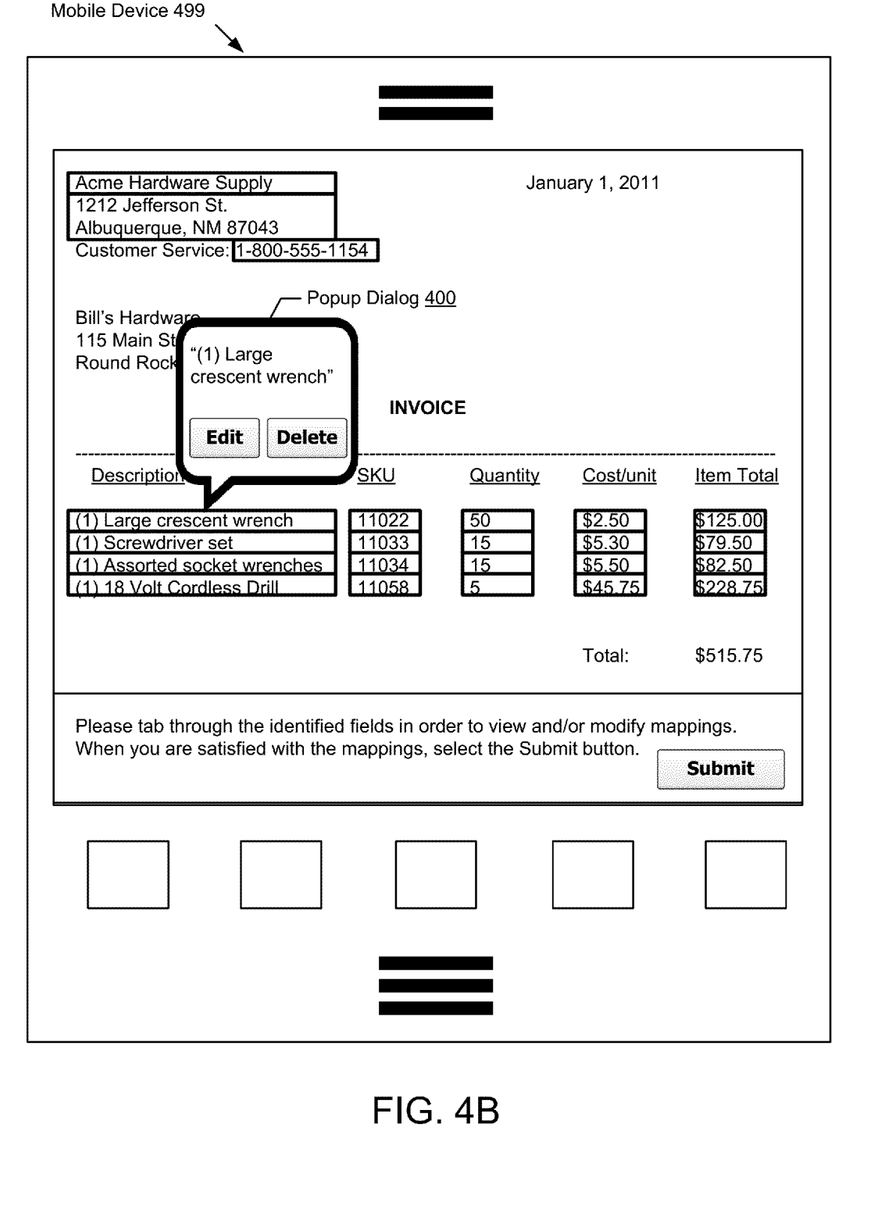

Continuing the example, the owner selects an option to capture the inventory data from the invoice. The mobile device then submits the invoice to a third party inventory management server (not shown) external to the business location. The inventory management server searches an inventory management database and identifies a template corresponding to Acme Hardware Supply in the database. The template includes relative distance-based coordinates for a set of fields on the invoice. For example, one of the coordinates identifies the name field by the following distances: 0.3, 0.3, 0.2, 2.2. The inventory management server interprets these distances to be edges of a rectangular region of invoice. The first edge is 0.3 inches from the top of the invoice, the second edge is 0.3 inches below the first edge, the third edge is 0.2 inches from the left-most side of the invoice and the fourth edge is 2.2 inches to the right of the third edge. Furthermore, some regions of the invoice are identified using more complicated logic in conjunction with the coordinates. For example, the first product line item of the invoice ("Large crescent wrench") is identified using simple coordinates. However, subsequent line item entries are identified by checking to make sure that white space does not exist beneath the previously identified line item and by identifying one or more other relative landmarks of the invoice (in this case, the key word "INVOICE," the keyword and location of the word "Total:" and the two horizontal dividers shown in FIG. 4A. FIG. 4B depicts regions of the invoice which are identified by the inventory management server using the aforementioned techniques.

Continuing the example, the inventory management server then performs optical character recognition (OCR) on the invoice. Based on the OCR, each coordinate obtained from the template is checked against OCR data to confirm that the mappings are correct. If the OCR analysis does not produce recognizable text within each of the identified regions of the invoice, that region identification is removed. Furthermore, the template identifies another set of validation criteria. Some of the regions include a data type attribute which indicates the type of data which should reside within the region. For example, the "Cost/unit" and "Item total" regions have an accounting data type. Thus, the inventory management server checks to validate that all values within those regions on the invoice include only dollar amounts. Other fields are similarly validated. Any regions which fail the validation test are removed.

Continuing the example, the inventory management server also obtains a set of labels associated with each region from the template. For example, the labels "Description," "SKU," "Quantity," "Cost/unit," and "Item Total" are associated with each one of the corresponding regions identified in FIG. 4A. The inventory management server then sends the regions, labels, data types, and other associated data back to the mobile device of the owner. At this point, as depicted by FIG. 4B, the identified regions are displayed to the owner for confirmation. The owner may select any region to view data type and label information for that region and may confirm, deny, add, or delete regions until all relevant data is identified on the invoice. The example of FIG. 4B shows a popup dialog (400) which is displayed to the user upon selection of an identified region. The tooltip may be used to edit text within the region and/or or delete the region entirely. Upon confirming the identified regions and text, the owner selects the "Submit" button to indicate confirmation of the regions and to submit the invoice back to the inventory management server for further processing. At this point, the updated/confirmed data is received by the inventory management server and the template for this supplier is updated to more accurately reflect the latest coordinates and metadata (i.e., labels, data types, etc) associated with the invoice.

Lastly, the business owner takes an image of a barcode of each product with the camera of the mobile device (499). The image is analyzed by the inventory management server to identify a product identifier of the product. For example, as depicted by FIGS. 4A and 4B, the product identifier "11022" is extracted from the barcode of the large crescent wrench. Each product identifier is automatically mapped to its corresponding product in the inventory management database. The inventory management server then retrieves a set of credentials from the user and accesses an inventory software of the business using the credentials. The inventory management server identifies the four purchased products within the inventory software and updates their quantities in the inventory database to reflect the added quantities identified on the invoice.

Figure 5:
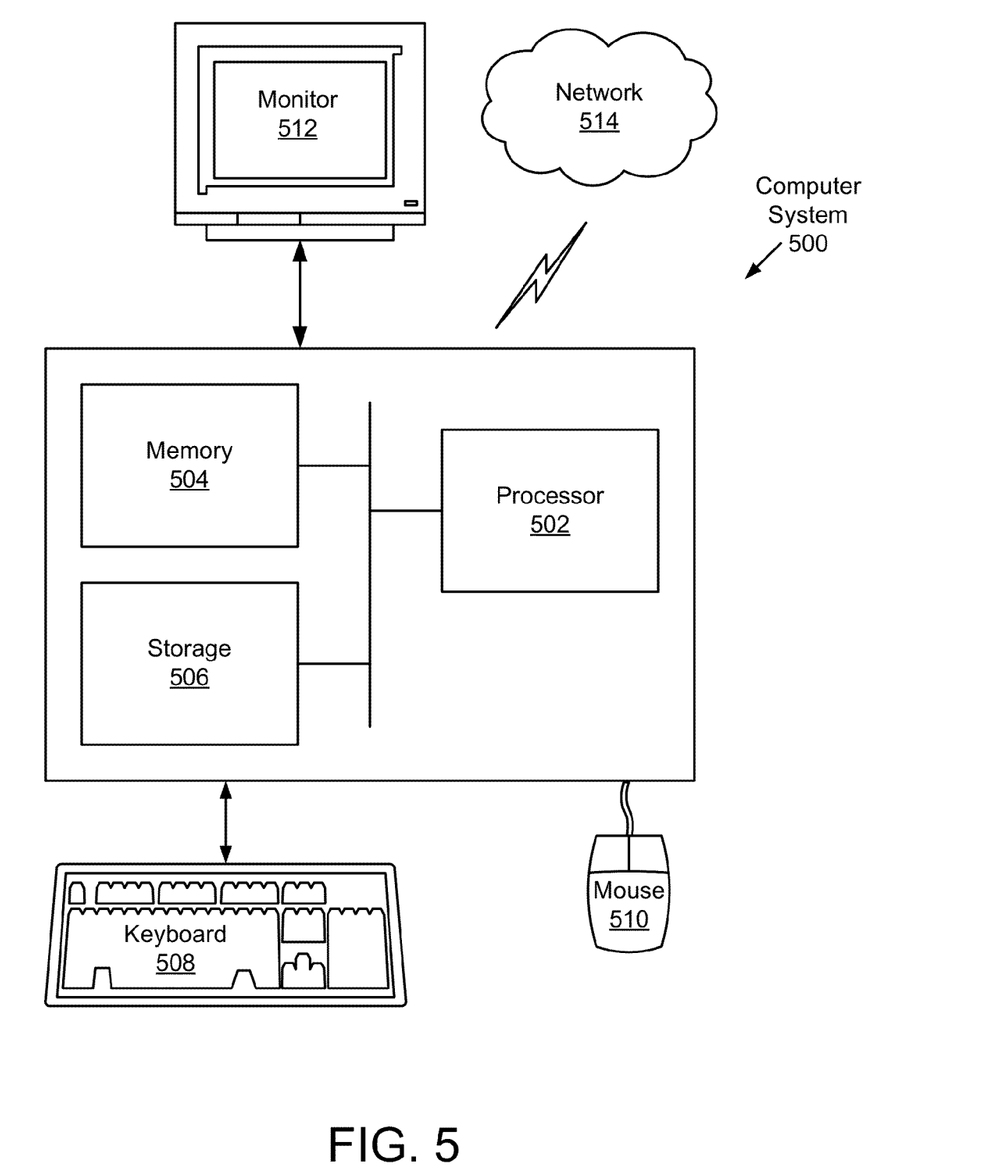
FIG. 5 shows a computer system in accordance with one or more embodiments of the invention.

Embodiments of the invention may be implemented on virtually any type of computer regardless of the platform being used. For example, as shown in FIG. 5, a computer system (500) includes one or more processor(s) (502) (such as a central processing unit (CPU), integrated circuit, hardware processor, etc.), associated memory (504) (e.g., RAM, cache memory, flash memory, etc.), a storage device (506) (e.g., a hard disk, an optical drive such as a compact disk drive or digital video disk (DVD) drive, a flash memory stick, etc.), and numerous other elements and functionalities typical of today's computers (not shown). The computer system (500) may also include input means, such as a keyboard (508), a mouse (510), or a microphone (not shown). Further, the computer system (500) may include output means, such as a monitor (512) (e.g., a liquid crystal display (LCD), a plasma display, or cathode ray tube (CRT) monitor). The computer system (500) may be connected to a network (514) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (500) includes at least the minimal processing, input, and/or output means necessary to practice embodiments of the invention.

Further, in one or more embodiments of the invention, one or more elements of the aforementioned computer system (500) may be located at a remote location and connected to the other elements over a network. Further, embodiments of the invention may be implemented on a distributed system having a plurality of nodes, where each portion of the invention (e.g., inventory management server (100), analytics engine (105), point of sale system (115), etc. of FIG. 1A, discussed above) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, memory, or any other tangible computer readable storage device.

One or more embodiments of the invention have one or more of the following advantages. By capturing data from an invoice sent from a supplier to a merchant, it may be possible to automatically update inventory amounts. Automatic re-ordering of products with low inventory quantities may be possible based on accurate inventory data. Product return invoices may also be more efficiently processed and reflected in the inventory database. User error associated with data entry may be reduced.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for inventory management, comprising:
obtaining a first invoice sent from a supplier to a first merchant;
capturing, by the computer processor, a plurality of labels and a plurality of fields on the first invoice,
wherein the plurality of labels describe a plurality of attributes of a first product purchased from the supplier, and
wherein the plurality of fields on the first invoice comprise a plurality of attributes values of the first product;
defining, by the computer processor, a plurality of field location coordinates of the plurality of fields on the first invoice;
defining, by the computer processor, a plurality of region location coordinates of a region on the first invoice,
wherein the region corresponds to a grouping of a subset of the plurality of fields, and
wherein the region location coordinates specify the edges of the region of the first invoice;
storing, using the plurality of labels, in a template for the supplier, the plurality of region location coordinates and the plurality of field location coordinates;
obtaining a second invoice sent from the supplier to a second merchant, wherein the second invoice comprises the plurality of fields;
capturing, from the plurality of fields on the second invoice, after storing in the template, and by the computer processor, a plurality of attribute values of a second product purchased from the supplier using the template; and
updating an entry, for the second product, in an inventory database of the second merchant with the plurality of attribute values of the second product captured using the template.

2. The method of claim 1, wherein obtaining the second invoice comprises:
receiving, from a representative of the second merchant, an email message comprising the second invoice; and
extracting the second invoice from the email message.

3. The method of claim 1, further comprising:
displaying the plurality of fields to the user; and
receiving a confirmation of the plurality of fields from the user.

4. The method of claim 1, wherein obtaining the second invoice comprises receiving an image of the second invoice taken by a mobile device, and wherein capturing the plurality of attribute values of the second product comprises performing optical character recognition (OCR) on the image.

5. The method of claim 1, further comprising:
retrieving, after obtaining the second invoice, the template from an inventory management database.

6. The method of claim 1, further comprising:
receiving, from a mobile device, an image of a barcode corresponding to the product;
extracting a product identifier of the product from the barcode;
mapping the product identifier to the product;
identifying, by the inventory database, a current inventory of the product using the product identifier; and
adding the quantity of the product to the current inventory.

7. The method of claim 1, further comprising:
identifying, for the second merchant, an average time period between periodic orders from the supplier;
detecting that the average time period has elapsed since a latest order from the supplier; and
sending a notification to the user that the time period has elapsed, wherein the notification comprises an option to submit a new order to the supplier.

8. The method of claim 7, further comprising:
identifying a current inventory of the product in the inventory database; and
determining that the current inventory is below a predefined inventory threshold, wherein sending the notification is in response to determining that the current inventory is below the predefined inventory threshold.

9. The method of claim 1, further comprising:
aggregating, prior to obtaining the second invoice, a plurality of invoices from a plurality of suppliers into an inventory management database, wherein the plurality of suppliers comprises the supplier;
identifying, after receiving the second invoice, a list of competing suppliers from the plurality of suppliers; and
sending the list of competing suppliers to the second merchant.

10. The method of claim 9, further comprising:
calculating an average cost of the product based on the plurality of invoices; and
sending the average cost to the second merchant with the list of competing suppliers.

11. The method of claim 1, wherein the first invoice is received from a mobile device of a representative of the first merchant.

12. The method of claim 1, wherein the inventory database is part of a point of sale (POS) system used by the second merchant.

13. The method of claim 1, wherein the second invoice is obtained by a web interface of a web application.

14. A system for inventory management, comprising:
a processor;
an inventory management database comprising a template for a supplier; and
an inventory management server executing on the processor and configured to:
obtain a first invoice sent from supplier to a first merchant;
capture a plurality of labels and a plurality of fields on the first invoice,
wherein the plurality of labels describe a plurality of attributes of a first product purchased from the supplier, and
wherein the plurality of fields on the first invoice comprise a plurality of attribute values of the first product;
define a plurality of field location coordinates of the plurality of fields on the first invoice;
define a plurality of region location coordinates of a region on the first invoice,
wherein the region corresponds to a grouping of a subset of the plurality of fields, and
wherein the region location coordinates specify the edges of the region of the first invoice;
storing, using the plurality of labels, in the template for the supplier, the plurality of region location coordinates and the plurality of field location coordinates;
obtain a second invoice sent from the supplier to a second merchant, wherein the second invoice comprises the plurality of fields;
capture, from the plurality of fields on the second invoice and after storing in the template, a plurality of attribute values of a second product purchased from the supplier using the template; and
update an entry, for the second product, in an inventory database of the second merchant with the plurality of attribute values of the second product captured using the template.

15. The system of claim 14, further comprising:
an analytics engine executing on the processor and configured to:
aggregate, prior to obtaining the second invoice, a plurality of invoices from a plurality of suppliers into an inventory management database, wherein the plurality of suppliers comprises the supplier;
identify, after receiving the second invoice, a list of competing suppliers from the plurality of suppliers; and
send the list of competing suppliers to the second merchant.

16. The system of claim 15, wherein the analytics engine is further configured to:
calculate an average cost of the product based on the plurality of invoices; and
send the average cost to the second merchant with the list of competing suppliers.

17. The system of claim 14, further comprising:
the inventory database comprising a current inventory of the product and configured to:
identify the current inventory of the product using a product identifier; and
add the quantity of the product to the current inventory.

18. The system of claim 17, wherein the inventory management server is further configured to:
send the plurality of fields to the user; and
receive a confirmation of the plurality of fields from the user.

19. The system of claim 14, wherein the inventory management server is further configured to:
receive, from a mobile device, an image of a barcode corresponding to the product;
extract the product identifier of the product from the barcode; and
map the product identifier to the product.

20. The system of claim 14, further comprising:
a mobile device configured to obtain an image of the second invoice, wherein capturing the plurality of attribute values of the second product comprises performing optical character recognition (OCR) on the image.

21. The system of claim 14, wherein obtaining the second invoice comprises:
receiving, from a representative of the second merchant, an email message comprising the second invoice; and
extracting the second invoice from the email message.

22. The system of claim 14, wherein the inventory management server is further configured to:
- retrieve, after obtaining the second invoice, the template from the inventory management database;
- update the template for the supplier based on capturing the second plurality of inventory data; and
- store the template in the inventory management database after updating the template based on the second plurality of inventory data.

23. The system of claim 14, wherein the inventory management server is further configured to:
- identify, for the second merchant, an average time period between periodic orders from the supplier;
- detect that the average time period has elapsed since a latest order from the supplier; and
- send a notification to the user that the time period has elapsed, wherein the notification comprises an option to submit a new order to the supplier.

24. The system of claim 23, wherein the inventory management server is further configured to:
- identify a current inventory of the product in the inventory database; and
- determine that the current inventory is below a predefined inventory threshold, wherein sending the notification is in response to determining that the current inventory is below the predefined inventory threshold.

25. The system of claim 14, wherein the first invoice is received from a mobile device of a representative of the first merchant.

26. The system of claim 14, wherein the inventory database is part of a point of sale (POS) system used by the second merchant.

27. The system of claim 14, further comprising:
- a web application comprising a web interface configured to upload the first invoice and the second invoice to the inventory management server.

28. The system of claim 14, wherein the inventory management server comprises the inventory management database.

29. A non-transitory computer-readable storage medium storing a plurality of instructions for inventory management, the plurality of instructions when executed by a computer processor cause the computer processor to:
- obtain a first invoice sent from a supplier to a first merchant, wherein the first invoice has a plurality of edges;
- capture, by the computer processor, a plurality of labels and a plurality of fields on the first invoice,
  - wherein the plurality of labels describe a plurality of attributes of a first product purchased from the supplier, and
  - wherein the plurality of fields on the first invoice comprise a plurality of attribute values of the first product;
- define a plurality of field location coordinates of the plurality of fields on the first invoice;
- define a plurality of region location coordinates of a region on the first invoice,
  - wherein the region corresponds to a grouping of a subset of the plurality of fields, and
  - wherein the region location coordinates specify the edges of the region of the first invoice;
- storing, using the plurality of labels, in a template for the supplier, the plurality of region location coordinates and the plurality of field location coordinates;
- obtain a second invoice sent from the supplier to a second merchant, wherein the second invoice comprises the plurality of fields;
- capture, from the plurality of fields on the second invoice and after storing in the template and by the computer processor, a plurality of attribute values of a second product purchased from the supplier using the template; and
- update an entry, for the second product, in an inventory database of the second merchant with the plurality of attribute values of the second product captured using the template.

30. The non-transitory computer-readable storage medium of claim 29, wherein obtaining the second invoice comprises:
- receiving, from a representative of the second merchant, an email message comprising the second invoice; and
- extracting the second invoice from the email message.

31. The non-transitory computer-readable storage medium of claim 29, wherein the plurality of instructions further comprise functionality to:
- displaying the plurality of fields to the user; and
- receiving a confirmation of the plurality of fields from the user.

32. The non-transitory computer-readable storage medium of claim 29, wherein obtaining the second invoice comprises receiving an image of the second invoice taken by a mobile device, and wherein capturing the plurality of attribute values of the second product comprises performing optical character recognition (OCR) on the image.

33. The non-transitory computer-readable storage medium of claim 29, wherein the plurality of instructions further comprise functionality to:
- retrieve, after obtaining the second invoice, the template from an inventory management database.

34. The non-transitory computer-readable storage medium of claim 29, wherein the plurality of instructions further comprise functionality to:
- receive, from a mobile device, an image of a barcode corresponding to the product;
- extract a product identifier of the product from the barcode;
- map the product identifier to the product;
- identify, by the inventory database, a current inventory of the product using the product identifier; and
- add the quantity of the product to the current inventory.

35. The non-transitory computer-readable storage medium of claim 29, wherein the plurality of instructions further comprise functionality to:
- identify, for the second merchant, an average time period between periodic orders from the supplier;
- detect that the average time period has elapsed since a latest order from the supplier; and
- send a notification to the user that the time period has elapsed, wherein the notification comprises an option to submit a new order to the supplier.

36. The non-transitory computer-readable storage medium of claim 35, wherein the plurality of instructions further comprise functionality to:
- identify a current inventory of the product in the inventory database; and
- determine that the current inventory is below a predefined inventory threshold, wherein sending the notification is in response to determining that the current inventory is below the predefined inventory threshold.

37. The non-transitory computer-readable storage medium of claim 29, wherein the plurality of instructions further comprise functionality to:
- aggregate, prior to obtaining the second invoice, a plurality of invoices from a plurality of suppliers into an inventory management database, wherein the plurality of suppliers comprises the supplier;

identify, after receiving the second invoice, a list of competing suppliers from the plurality of suppliers; and send the list of competing suppliers to the second merchant.

38. The non-transitory computer-readable storage medium of claim 37, wherein the plurality of instructions further comprise functionality to:

calculate an average cost of the product based on the plurality of invoices; and send the average cost to the second merchant with the list of competing suppliers.

39. The non-transitory computer-readable storage medium of claim 29, wherein the first invoice is received from a mobile device of a representative of the first merchant.

40. The non-transitory computer-readable storage medium of claim 29, wherein the inventory database is part of a point of sale (POS) system used by the second merchant.

41. The non-transitory computer-readable storage medium of claim 29, wherein the second invoice is obtained by a web interface of a web application.

* * * * *